US011176828B2

(12) United States Patent
Wright et al.

(10) Patent No.: US 11,176,828 B2
(45) Date of Patent: Nov. 16, 2021

(54) DERIVING AN EQUIVALENT REAL-TIME ENGINE CONTROL UNIT (ECU) SPEED OF A VEHICLE

(71) Applicant: Verizon Connect Inc., Arlington, GA (US)

(72) Inventors: Steven Paul Wright, Pflugerville, TX (US); John Thomas Morris, Round Rock, TX (US); Paul Casey, Austin, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 626 days.

(21) Appl. No.: 16/162,743

(22) Filed: Oct. 17, 2018

(65) Prior Publication Data

US 2020/0126426 A1   Apr. 23, 2020

(51) Int. Cl.
*G08G 1/00* (2006.01)
*G08G 1/127* (2006.01)
*B60W 40/10* (2012.01)
*B60W 50/04* (2006.01)

(52) U.S. Cl.
CPC .............. *G08G 1/20* (2013.01); *B60W 40/10* (2013.01); *G08G 1/127* (2013.01); *B60W 2050/046* (2013.01); *B60W 2520/10* (2013.01); *B60W 2530/145* (2013.01); *B60W 2530/18* (2013.01)

(58) Field of Classification Search
CPC ....... B60W 2050/046; B60W 2520/10; B60W 2530/145; B60W 2530/18; B60W 40/10; G08G 1/127
See application file for complete search history.

(56) References Cited

U.S. PATENT DOCUMENTS 5,828,585 A * 10/1998 Welk ...................... G01C 21/28
702/96
2017/0103588 A1* 4/2017 Rajani .................. G07C 5/0808

\* cited by examiner

*Primary Examiner* — Charles J Han

(57) ABSTRACT

A server device can obtain historical location data, concerning a vehicle, captured by a global positioning system (GPS) device of the vehicle and historical engine control unit (ECU) data concerning the vehicle captured by an ECU of the vehicle. The server device can process the historical location data and the historical ECU data to train a machine learning model to determine a relationship between the historical location data and the historical ECU data. The server device can receive location data and ECU data concerning the vehicle and update the machine learning model based on the location data and the ECU data. The server device can receive real-time location data concerning the vehicle and derive an equivalent real-time ECU speed using the machine learning model. The server device can generate a message regarding the equivalent real-time ECU speed of the vehicle and send the message to a remote device for display.

20 Claims, 7 Drawing Sheets

100

DERIVING AN EQUIVALENT REAL-TIME ENGINE CONTROL UNIT (ECU) SPEED OF A VEHICLE

BACKGROUND

A fleet management system can track a geographic location of a vehicle in a fleet of vehicles. Vehicle location data can be determined using a Global Positioning System (GPS), and can be transmitted from the vehicle to the fleet management system via a Short Message Service (SMS) network, a General Packet Radio Service (GPRS) network, a satellite or terrestrial radio network, a cellular network, and/or the like.

DETAILED DESCRIPTION OF PREFERRED EMBODIMENTS

Figure 1A:
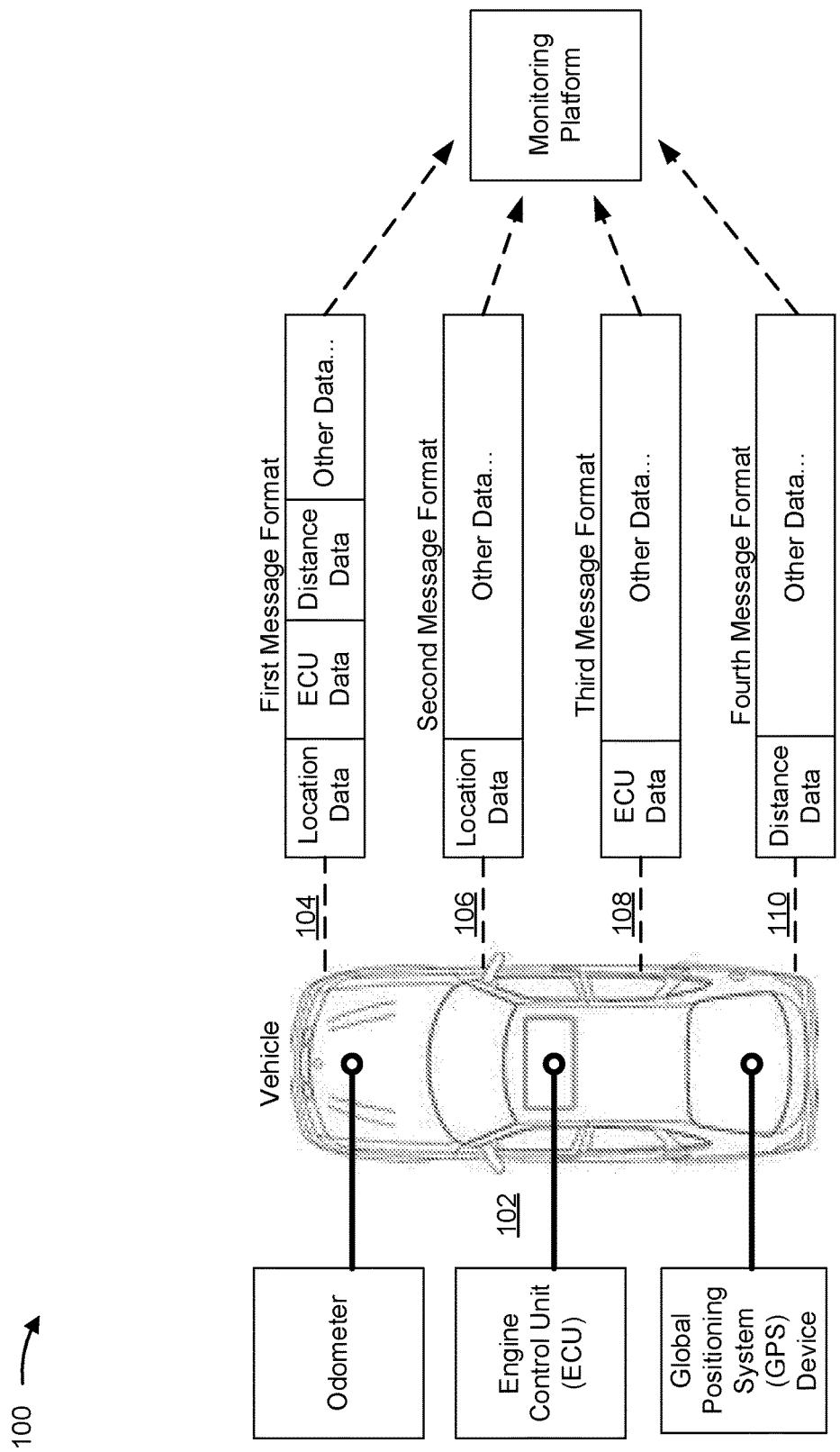
FIGS. 1A-1D are diagrams of example implementations described herein.

The following detailed description of example implementations refers to the accompanying drawings. The same reference numbers in different drawings can identify the same or similar elements.

A fleet management system monitors the movement of one or more vehicles in a fleet of vehicles. A vehicle, of the one or more vehicles, can have a Global Positioning System (GPS) device that captures location data, an engine control unit (ECU) that captures ECU data, and an odometer that captures distance data. The vehicle can transmit the location data, ECU data, and distance data to the fleet management system, but often not at the same time and/or not in real-time. In some cases, the vehicle can transmit only limited amounts of information at one time, so the vehicle must prioritize certain data over other data to be sent to the fleet management system. In many cases, the vehicle prioritizes sending location data over sending ECU data and/or distance data. This can lead to the fleet management system not having enough information to continuously track the ECU speed of the vehicle (e.g., a speed of the vehicle captured by the ECU). Furthermore, the fleet management system can determine a GPS speed of the vehicle (e.g., a speed of the vehicle as captured by the GPS) from location data, but the GPS speed may not match the ECU speed, which may cause the fleet management system to unnecessarily flag speed reporting issues.

Some implementations described herein provide a monitoring platform that trains a machine learning model using historical location data, historical ECU data, and/or historical distance data to determine a relationship between the location data and the ECU data and/or the distance data, such as a relationship between the GPS speed and the ECU speed, which allows the machine learning model to more accurately derive an equivalent real-time ECU speed (e.g., a predicted, an approximated, a calculated, a derived and/or the like real-time ECU speed) when only real-time GPS speed is available. In some implementations, the vehicle sends location data, ECU data, and/or distance data to the monitoring platform and the monitoring platform updates and/or retrains the machine learning model using the location data, the ECU data, and/or the distance data. In some implementations, the monitoring platform can send a message to a client device regarding the equivalent real-time ECU speed. In some implementations, the client device can display the message that includes information concerning the equivalent real-time ECU speed.

In this way, implementations described herein can alert fleet managers and/or a driver of the vehicle regarding the equivalent real-time ECU speed of the vehicle when ECU data is not available. For example, the monitoring platform can send an alert that indicates that the equivalent real-time ECU speed of the vehicle exceeds the speed limit of a road that the vehicle is travelling on. In this way, implementations described herein provide drivers of a fleet of vehicles with information that can be used to change the driving behavior of the drivers. Similarly, implementations described herein can allow the fleet managers to create safe driving training materials and/or guidelines, which can prevent or reduce high-speed driving events. This can result in the increased safety of the drivers, the vehicles that the drivers operate, and other people and property. This can also result in less wear-and-tear on fleet vehicles or components of the fleet vehicles, which can reduce costs associated with maintaining the fleet of vehicles.

Furthermore, implementations described herein are automated and can capture and process numerous (e.g., hundreds, thousands, millions, billions, and/or the like) data points to determine relationships among location data, ECU data, and/or distance data of multiple vehicles (e.g., hundreds, thousands, millions, and/or the like) at the same time. This can improve speed and efficiency of the process and conserve computing resources (e.g., processor resources, memory resources, and/or the like) of the monitoring platform and/or the client device. Furthermore, implementations described herein use a rigorous, computerized process to perform tasks or roles that were not previously performed or were previously performed using subjective human intuition or input. For example, currently there does not exist a technique to automatically collect information concerning location data, ECU data, and/or distance data of a vehicle to determine a relationship between the location data, the ECU data and/or the distance data. Finally, implementations described herein conserve computing resources (e.g., processor resources, memory resources, and/or the like) that would otherwise be wasted in attempting to assist a human in collecting location data, ECU data, and/or distance data of a vehicle, determining a relationship between the location data, the ECU data and/or the distance data, and deriving an equivalent real-time ECU speed based on real-time GPS speed by hand.

FIGS. 1A-1D are diagrams of example implementations 100 described herein. As shown in FIG. 1A, example implementation 100 can include a vehicle and a monitoring platform. In some implementations, the vehicle is a vehicle in a vehicle fleet (e.g., that is monitored by the monitoring platform). Some example implementations described herein concern a single vehicle, but implementations can include a plurality of vehicles. In some implementations, the vehicle can communicate with the monitoring platform via a wireless connection, such as a cellular connection. In some implementations, the vehicle can communicate with the monitoring platform via the cellular connection through a base station.

In some implementations, the vehicle can have one or more systems to communicate with the monitoring platform. In some implementations, the one or more systems can comprise and/or be connected to one or more devices. As shown by reference number 102, the one or more devices can include a Global Positioning System (GPS) device, an engine control unit (ECU), an odometer, and/or the like.

In some implementations, the GPS device can capture location data concerning the vehicle, such as a location of the vehicle (e.g., represented as a latitude and longitude pair), a time of the location of the vehicle (e.g., when the vehicle is at the location), a heading of the vehicle (e.g., which way the vehicle is pointing, such as in degrees away from north, where north is represented by 0 degrees), a distance from a last recorded location of the vehicle, a GPS speed of the vehicle (e.g., a speed of the vehicle represented as miles per hour, kilometers per hour, meters per minute, feet per second, centimeters per second, and/or the like), and/or the like. In some implementations, the ECU can capture ECU data concerning the vehicle, such as an ECU speed of the vehicle (e.g., represented as miles per hour, kilometers per hour, meters per minute, feet per second, and/or the like), a time of the ECU speed of the vehicle (e.g., when the vehicle is traveling at the ECU speed), and/or the like. In some implementations, the ECU can obtain and/or determine the ECU data from an engine diagnostic bus of the vehicle. For example, the ECU can obtain, via the engine diagnostic bus, a revolution frequency of a drive shaft of an engine of the vehicle and determine the ECU speed (e.g., diagnostic speed) based on the revolution frequency. In some implementations, the odometer can capture distance data concerning the vehicle, such as a distance travelled of the vehicle (e.g., represented as feet, meters, kilometers, miles, and/or the like), a time of the distance travelled of the vehicle (e.g., when the vehicle reached the distance travelled), and/or the like. In some implementations, the GPS speed can indicate a speed of the vehicle that is the same or similar as a speed of the vehicle indicated by the ECU speed. In some implementations, the GPS speed can indicate a speed of the vehicle that is different than a speed of the vehicle indicated by the ECU speed.

In some implementations, the vehicle can travel down a roadway. In some implementations, the vehicle can send one or more messages to the monitoring platform as the vehicle is travelling. For example, the vehicle can send one or messages that include location data, ECU data, distance data, and/or the like to the monitoring platform. In some implementations, the vehicle can send the one or more messages, where the one or more messages conform to different message formats, to the monitoring platform. For example, as shown by reference number 104, the vehicle can send a first message, which conforms to a first message format, that comprises the location data, the ECU data, the distance data, and/or the like, to the monitoring platform. As another example, as shown by reference number 106, the vehicle can send a second message, which conforms to a second message format, that comprises the location data and/or the like, to the monitoring platform. As an additional example, as shown by reference number 108, the vehicle can send a third message, which conforms to a third message format, that comprises the ECU data and/or the like, to the monitoring platform. As another example, as shown by reference number 110, the vehicle can send a fourth message, which conforms to a fourth message format, that comprises the distance data and/or the like to the monitoring platform.

In some implementations, the vehicle can send the one or more messages on a schedule, such as every second, every twenty-two seconds, every minute, every three minutes, and/or the like. In some implementations, the vehicle can send a message of one message format more frequently than a message of another message format. For example, the vehicle can send messages of the second message format more frequently than messages of the third message format.

In some implementations, the monitoring platform can receive the one or more messages. In some implementations, the monitoring platform can parse the one or more messages to identify the location data, the ECU data, the distance data, and/or the like.

Figure 1B:
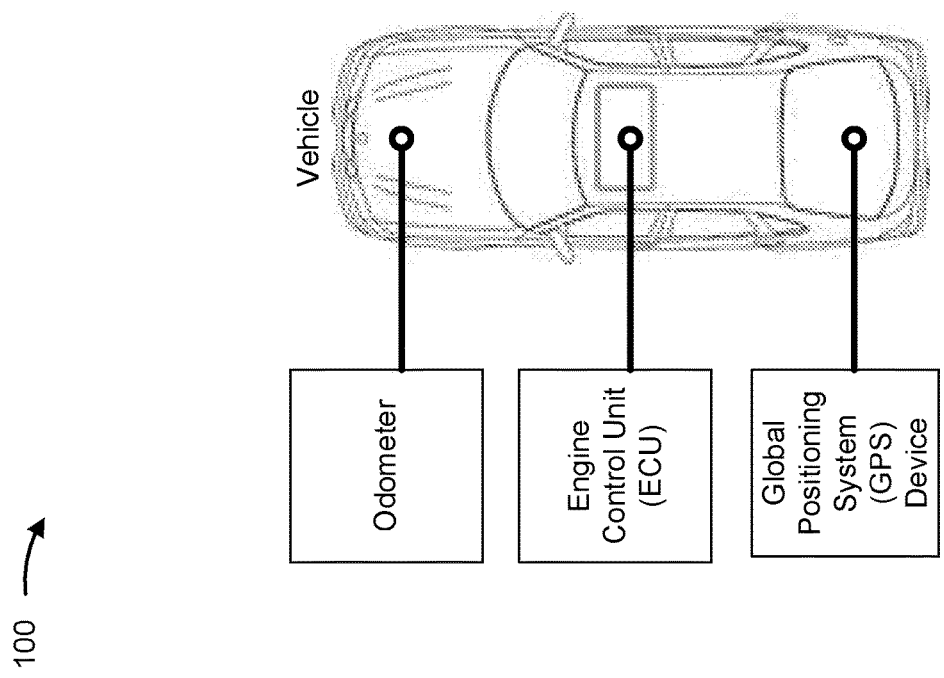
Figure 1B:
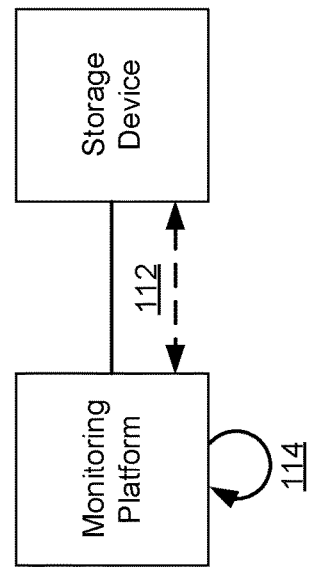

As shown in FIG. 1B and by reference number 112, the monitoring platform can store the location data, the ECU data, the distance data, and/or the like in a data structure. In some implementations, the monitoring platform can send the location data, the ECU data, the distance data, and/or the like to a storage device for storage.

In some implementations, the monitoring platform can obtain historical information concerning the vehicle from the storage device. In some implementations, the historical information can include historical location data of the vehicle, such as location data captured by the GPS over a first period of time (e.g., a one-week period of time, a two-month period of time, a one-year period of time, and/or the like). In some implementations, the historical information can include historical ECU data of the vehicle, such as ECU data captured by the ECU over a second period of time (e.g., the same or similar period of time as the first period of time). In some implementations, the historical information can include historical distance data of the vehicle, such as distance data captured by the odometer over a third period of time (e.g., the same or similar period of time as the first period of time and/or the second period of time).

In some implementations, the historical location data can include a plurality of location elements and a respective plurality of first timing elements (e.g., a plurality of tuples, where each tuple comprises a location element and a first timing element, such as a GPS speed of the vehicle and a time of the location of the vehicle). Additionally, or alternatively, the historical ECU data can include a plurality of ECU elements and a respective plurality of second timing elements (e.g., a plurality of tuples, where each tuple comprises an ECU element and a second timing element, such as an ECU speed of the vehicle and a time of the ECU speed of the vehicle). Additionally, or alternatively, the historical distance data can include a plurality of distance elements and a respective plurality of third timing elements (e.g., a plurality of tuples, where each tuple comprises a distance element and a third timing element, such as a distance travelled of the vehicle and a time of the distance travelled of the vehicle).

As shown by reference number 114, the monitoring platform can process the historical information to train a machine learning model to determine a relationship among the location data of the vehicle, the ECU data of the vehicle, and/or the distance data of the vehicle. For example, the monitoring platform can process the historical location data and the historical ECU data and/or the historical distance data to train the machine learning model to determine a relationship between the GPS speed of the vehicle and the ECU speed of the vehicle. Further, the monitoring platform can process a set of location elements of the plurality of location elements, a set of first timing elements of the plurality of first timing elements, a set of ECU elements of the plurality of speed elements, a set of second timing elements of the plurality of second timing elements, a set of distance elements of the plurality of distance elements, a set of third timing elements of the plurality of third timing elements, and/or the like to train the machine learning model.

For example, the monitoring platform can determine the set of first timing elements, the set of second timing elements, the set of third timing elements, and/or the like by determining which first timing elements of the plurality of first timing elements correspond to the second timing elements of the plurality of second timing elements and/or the third timing elements of the plurality of third timing elements (e.g., a first timing element has a time that matches a time of a second timing element and/or a third timing element). Further, the monitoring platform can select the set of location elements based on the set of first timing elements, the set of ECU elements based on the set of second timing elements, and/or the set of distance elements based on the set of third timing elements. In this way, the monitoring platform can ensure that the machine learning model is trained using data that was captured at the same (or similar) time, which thereby improves the ability of the machine learning model to model the relationship among the location data of the vehicle, the ECU data of the vehicle, and/or the distance data of the vehicle.

In some implementations, the machine learning model can determine that the relationship is a mathematical relationship, such as a proportional relationship, a linear relationship, a nonlinear relationship, and/or the like. In some implementations, the monitoring platform can train the machine learning model so that the machine learning model can derive (e.g., determine, calculate, predict, and/or the like) an equivalent ECU speed of the vehicle (e.g., a predicted, an approximated, a calculated, and/or the like ECU speed of the vehicle) based on the GPS speed of the vehicle. For example, the machine learning model can derive an equivalent ECU speed of the vehicle, based on the GPS speed of the vehicle, that approximates the ECU speed of the vehicle that would be captured by the ECU and would be part of the ECU data if the ECU data were available to the monitoring platform.

In some implementations, the monitoring platform can perform a set of data manipulation procedures to process the historical information to generate the machine learning model, such as a data preprocessing procedure, a model training procedure, a model verification procedure, and/or the like. For example, the monitoring platform can preprocess the historical location data and the historical ECU data and/or the historical distance data to remove numbers and/or letters, non-ASCII characters, other special characters, white spaces, confidential data, and/or the like. In this way, the monitoring platform can organize thousands, millions, or billions of data entries for machine learning and model generation—a data set that cannot be processed objectively by a human actor.

In some implementations, the monitoring platform can perform a training operation when generating the machine learning model. For example, the monitoring platform can portion the historical information into a training set, a validation set, a test set, and/or the like. In some implementations, the monitoring platform can train the machine learning model using, for example, an unsupervised training procedure and based on the training set of the data. In some implementations, the monitoring platform can perform dimensionality reduction to reduce the historical information to a minimum feature set, thereby reducing processing to train the machine learning model, and can apply a classification technique, to the minimum feature set.

In some implementations, the monitoring platform can use a logistic regression classification technique to determine a categorical outcome (e.g., that a particular relationship exists among particular historical location data, particular historical ECU data, and/or particular historical distance data). Additionally, or alternatively, the monitoring platform can use a naïve Bayesian classifier technique. In this case, the monitoring platform can perform binary recursive partitioning to split the data of the minimum feature set into partitions and/or branches, and use the partitions and/or branches to perform predictions (e.g., that a relationship among particular historical location data, particular historical ECU data, and/or particular historical distance data is proportional, linear, nonlinear, and/or the like). Based on using recursive partitioning, the monitoring platform can reduce utilization of computing resources relative to manual, linear sorting and analysis of data points, thereby enabling use of thousands, millions, or billions of data points to train the machine learning model, which can result in a more accurate machine learning model than using fewer data points.

Additionally, or alternatively, the monitoring platform can use a support vector machine (SVM) classifier technique to generate a non-linear boundary between data points in the training set. In this case, the non-linear boundary is used to classify test data (e.g., particular historical location data and particular historical ECU data and/or particular historical distance data) into a particular class (e.g., a class indicating that the relationship among particular historical location data, particular historical ECU data, and/or particular historical distance data is proportional, linear, nonlinear, and/or the like).

Additionally, or alternatively, the monitoring platform can train the machine learning model using a supervised training procedure that includes receiving input to the model from a subject matter expert, which can reduce an amount of time, an amount of processing resources, and/or the like to train the machine learning model relative to an unsupervised training procedure. In some implementations, the monitoring platform can use one or more other model training techniques, such as a neural network technique, a latent semantic indexing technique, and/or the like. For example, the monitoring platform can perform an artificial neural network processing technique (e.g., using a two-layer feedforward neural network architecture, a three-layer feedforward neural network architecture, and/or the like) to perform pattern recognition with regard to patterns of whether a relationship among particular historical location data, particular historical ECU data, and/or particular historical distance data is proportional, linear, nonlinear, and/or the like. In this case, using the artificial neural network processing technique can improve an accuracy of the machine learning model generated by the monitoring platform by being more robust to noisy, imprecise, or incomplete data, and by enabling the monitoring platform to detect patterns and/or trends undetectable to human analysts or systems using less complex techniques.

Accordingly, the monitoring platform can use any number of artificial intelligence techniques, machine learning techniques, deep learning techniques, and/or the like to determine the relationship among the location data of the vehicle, the ECU data of the vehicle and/or the distance data of the vehicle, such as the relationship between the GPS speed of the vehicle and the ECU speed of the vehicle. Some implementations described herein concern training a machine learning model for a single vehicle based on data from the single vehicle, but implementations also include training one or more machine learning models for a plurality of vehicles based on data from the plurality of vehicles.

Figure 1C:
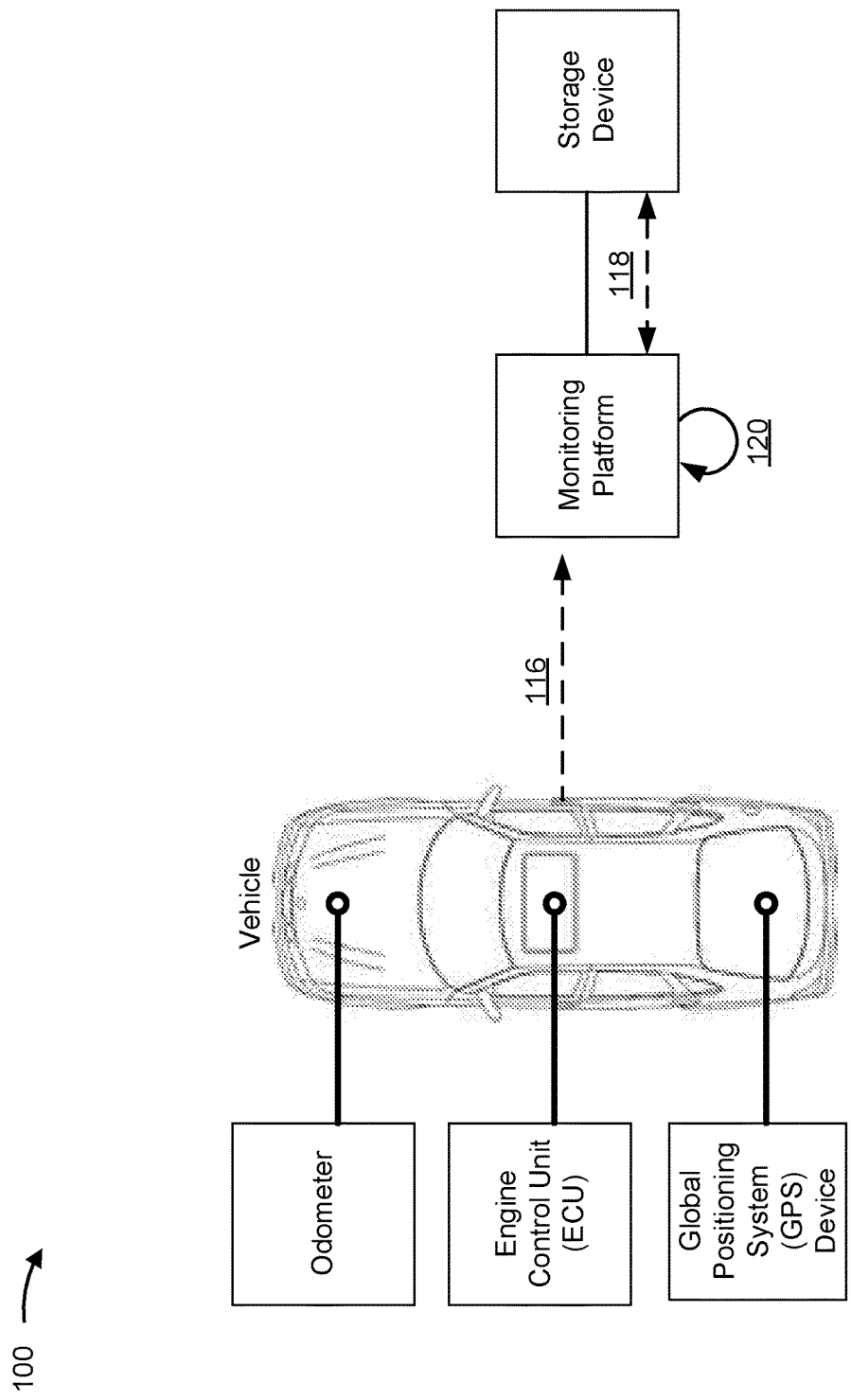

As shown in FIG. 1C and by reference number 116, the vehicle sends one or more messages that include additional location data, ECU data, distance data, and/or the like (e.g., location data, ECU data, distance data, and/or the like concerning an active trip of the vehicle) to the monitoring platform in a similar manner as described herein in relation to FIG. 1A. In some implementations, the vehicle can capture the location data using the GPS device of the vehicle, the ECU data using the ECU of the vehicle, and the distance data using the odometer of the vehicle. In some implementations, the monitoring platform can receive and parse the one or more messages that include the location data, the ECU data, the distance data, and/or the like in a similar manner as described herein in relation to FIG. 1B.

As shown by reference number 118, the monitoring platform can store the location data, the ECU data, the distance data, and/or the like in the storage device and obtain current information concerning the vehicle from the storage device in a similar manner as described herein in relation to FIG. 1B. In some implementations, the current information includes current location data of the vehicle, such as location data captured by the GPS over a current period of time (e.g., the period of time concerning the active trip of the vehicle). In some implementations, the current information can include current ECU data of the vehicle, such as ECU data captured by the ECU over the current period of time. In some implementations, the current information can include current distance data of the vehicle, such as data captured by the odometer over the current period of time.

As shown by reference number 120, the monitoring platform can update the machine learning model based on the current information in a similar manner as described herein in relation to FIG. 1B. For example, the monitoring platform can process the current location data, the current ECU data, and/or the current distance data to update the machine learning model that determines the relationship among the location data of the vehicle, the ECU data of the vehicle, and/or the distance data of the vehicle.

In some implementations, the monitoring platform can filter the current information to remove erroneous data before processing the current information to update the machine learning model. For example, the monitoring platform can determine that a portion of the current location data is erroneous (e.g., the GPS device captured incorrect location data because of a bad connection with a GPS satellite due to the vehicle travelling in a tunnel, in a rural area with a thick canopy of trees, in a city with tall buildings, and/or the like). In some implementations, the monitoring platform can discard the portion of the current location data that is erroneous and a corresponding portion of the current ECU data and/or a corresponding portion of the current distance data. In some implementations, the monitoring platform can update the machine learning model based on the current location data and the current ECU data and/or the current distance data that were not discarded.

Figure 1D:
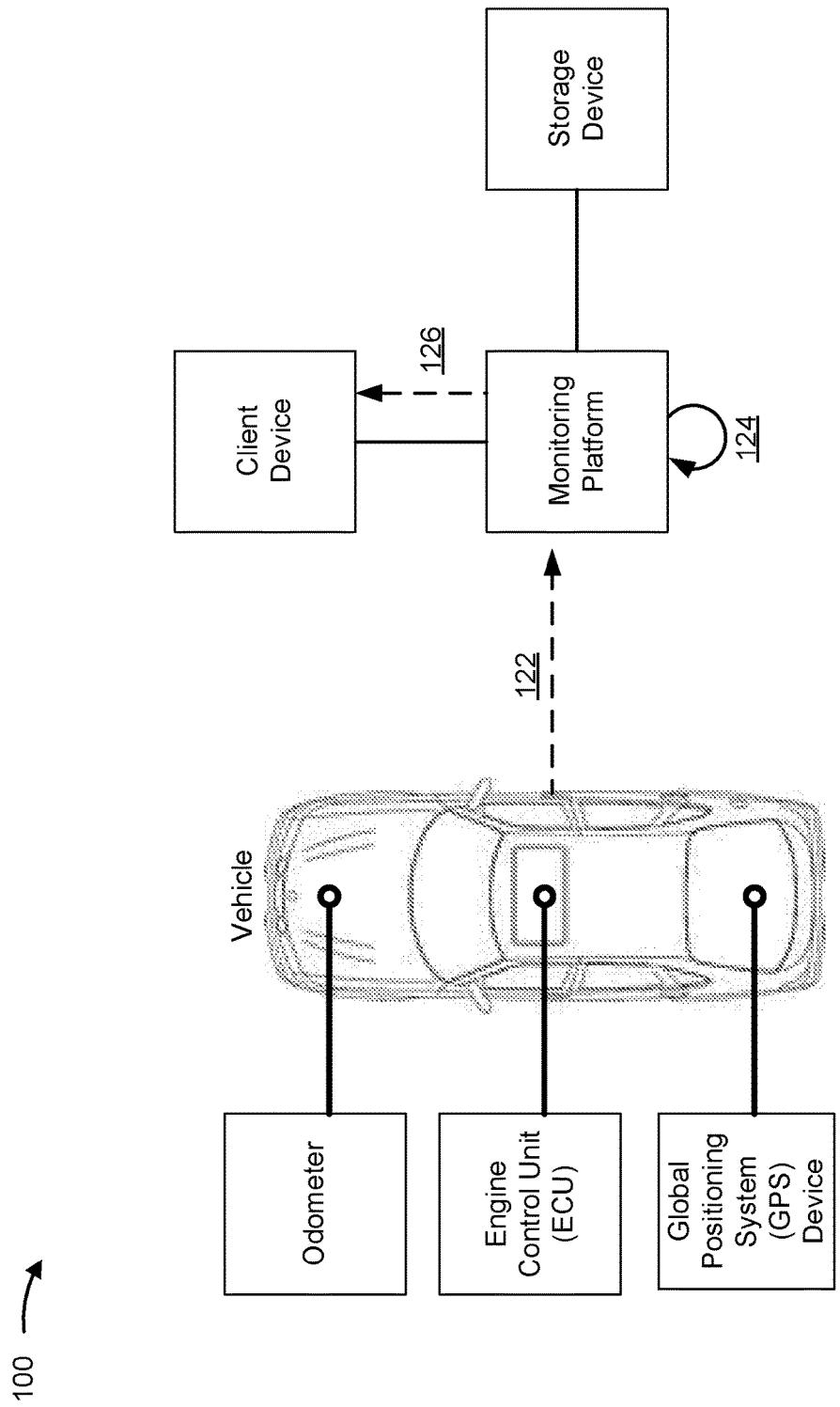

As shown in FIG. 1D and by reference number 122, the vehicle sends real-time location data (e.g., location data that is sent by the vehicle as soon as, or nearly as soon as, the GPS captures the location data) to the monitoring platform in a similar manner as described herein in relation to FIG. 1A. In some implementations, the vehicle can send one or more messages that include the real-time location data to the monitoring platform. In some implementations, the vehicle can send a message that includes the real-time location data, but does not include real-time ECU data, real-time distance data, and/or the like. For example, the vehicle can send a message that conforms to the second message format shown in FIG. 1A. In some implementations, the monitoring platform receives the message and parses the message to identify the real-time location data.

As shown by reference number 124, the monitoring platform can derive (e.g., determine, calculate, predict, and/or the like) an equivalent real-time ECU speed of the vehicle (e.g., a predicted, an approximated, a calculated, and/or the like real-time ECU speed of the vehicle) by processing the real-time GPS speed of the vehicle included in the real-time location data. For example, the monitoring platform can process the real-time GPS speed of the vehicle using the machine learning model to derive the equivalent real-time ECU speed of the vehicle. The equivalent real-time ECU speed of the vehicle can be an approximation for the real-time ECU speed of the vehicle that would be captured by the ECU and would be part of real-time ECU data if the real-time ECU data were available to the monitoring platform. In some implementations, the machine learning model processes the real-time GPS speed of the vehicle based on the relationship among the location data of the vehicle, the ECU data of the vehicle, and/or the distance data of the vehicle to derive the equivalent real-time ECU speed of the vehicle. In some implementations, the monitoring platform can generate a prediction that includes the equivalent real-time ECU speed of the vehicle and a confidence score indicating a likelihood that the equivalent real-time ECU speed is correct. For example, the confidence score can indicate a likelihood that the equivalent real-time ECU speed is correct in a percentage amount, such as a 10% confidence score, a 25% confidence score, a 53% confidence score, a 99% confidence score, and/or the like.

As shown by reference number 126, the monitoring platform generates a message regarding the equivalent real-time ECU speed of the vehicle and sends the message to a remote device, such as a client device. In some implementations, the monitoring platform can determine that the equivalent real-time ECU speed of the vehicle satisfies a threshold (e.g., that the equivalent real-time ECU speed of the vehicle exceeds a speed limit of a road the vehicle is traveling on, that the equivalent real-time ECU speed of the vehicle is well below an expected speed of a road that the vehicle is travelling on, and/or the like) and generate the message to include information concerning the equivalent real-time ECU speed and the real-time location data. In some implementations, the monitoring platform generates and sends the message only if the confidence score satisfies a threshold. For example, the monitoring platform can generate and send the message only if the confidence score exceeds 80%. If the confidence score does not satisfy the threshold, the monitoring platform can wait to receive new real-time location data and start the equivalent real-time ECU derivation process over again.

In some implementations, sending the message to the remote device causes the remote device to display the message. For example, sending the message to the client device can cause the client device to display a message that indicates the equivalent real-time ECU speed of the vehicle exceeds the speed limit of the road the vehicle is travelling on.

In some implementations, the monitoring platform sends the message to the vehicle. In some implementations, sending the message to vehicle causes the vehicle to automatically take an action, such as adjust the speed of the vehicle (e.g., apply a brake of the vehicle, adjust a cruise-control setting, adjust an acceleration setting, and/or the like), log the speed of the vehicle as reflected on the speedometer, provide an audible message and/or alert to the driver of the vehicle, activate a sensor to capture information regarding the functioning of the vehicle (e.g., to check for malfunctioning equipment, to log for training purposes, and/or the like), and/or the like.

As indicated above, FIG. 1 is provided merely as an example. Other examples are possible and can differ from what was described with regard to FIG. 1.

Figure 2:
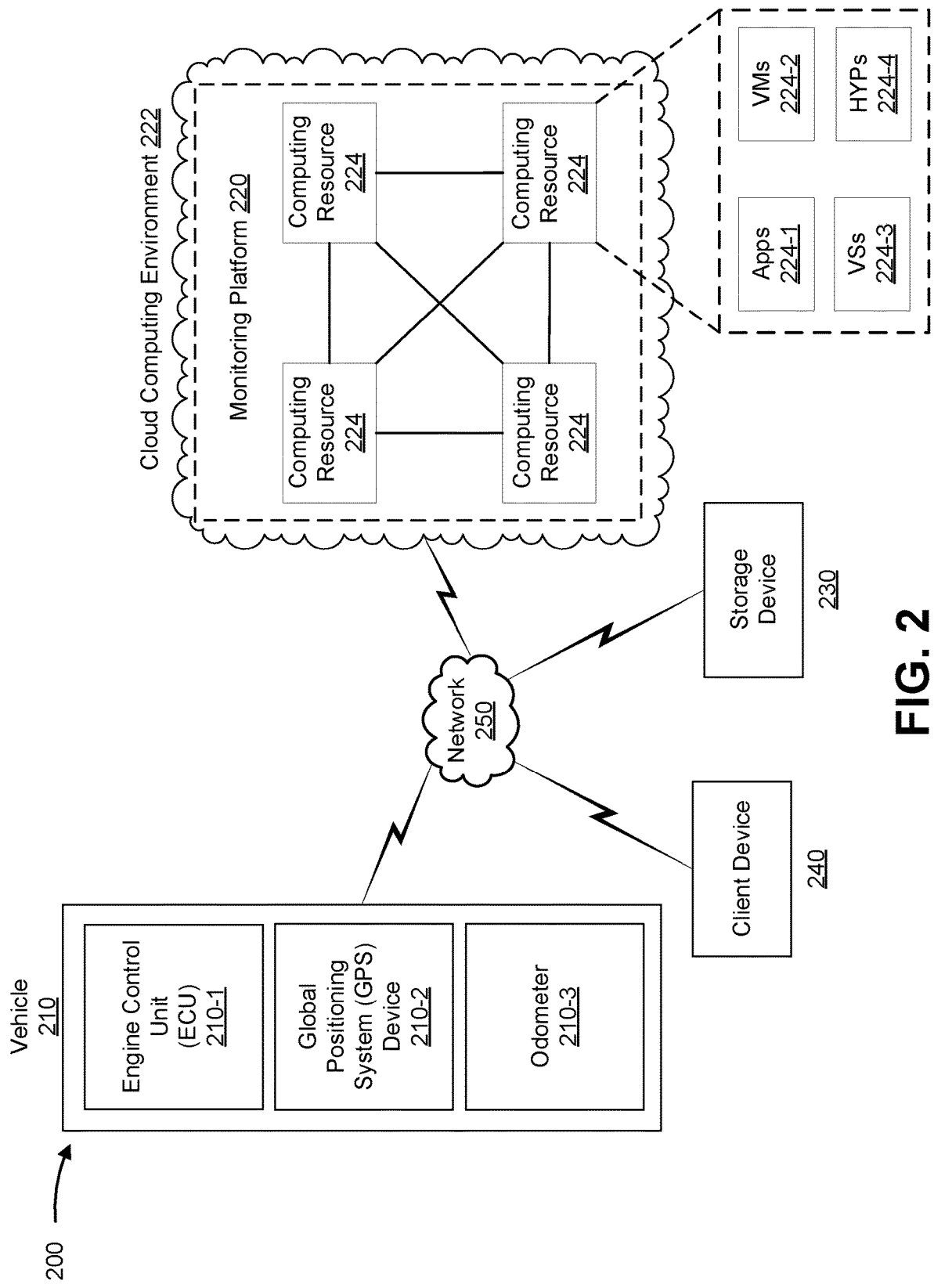
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a vehicle 210, a monitoring platform 220, a computing resource 224, a storage device 230, a client device 240, and a network 250. Devices of environment 200 can interconnect via wired connections, wireless connections, or a combination of wired and wireless connections.

Vehicle 210 can include engine control unit (ECU) 210-1, global positioning system (GPS) device 210-2, and odometer 210-3. ECU 210-1 can include one or more devices capable of receiving, generating, processing, storing, and/or providing information associated with a state of a vehicle engine of vehicle 210. GPS device 210-2 can include one or more devices capable of receiving, generating, processing, storing, and/or providing information associated with a location of vehicle 210. Odometer 210-3 can include one or more devices capable of receiving, generating, processing, storing, and/or providing information associated with a distance travelled of vehicle 210. In some implementations, vehicle 210 can use ECU 210-1 to capture ECU data, can use GPS device 210-2 to capture location data, and/or can use odometer 210-3 to capture distance data. In some implementations, vehicle 210 can include a communication device capable of receiving information from and/or providing information to monitoring platform 220. For example, vehicle 210 can send messages that include the location data, the ECU data, the distance data, and/or other data to monitoring platform 220.

Monitoring platform 220 includes one or more devices that receive information (e.g., the ECU data, the location data, the distance data, and/or the like) from vehicle 210, provide the information to storage device 230, process historical information stored by storage device 230 to train and/or update a machine learning model, derive an equivalent real-time ECU speed of the vehicle based on the real-time location data using the machine learning model, generate a message regarding the equivalent real-time ECU speed of the vehicle, and/or send the message to client device 240. In some implementations, monitoring platform 220 can be designed to be modular such that certain software components can be swapped in or out depending on a particular need. As such, monitoring platform 220 can be easily and/or quickly reconfigured for different uses. In some implementations, monitoring platform 220 can receive information from and/or transmit information to vehicle 210, storage device 230, client device 240, and/or the like.

In some implementations, as shown, monitoring platform 220 can be hosted in a cloud computing environment 222. Notably, while implementations described herein describe monitoring platform 220 as being hosted in cloud computing environment 222, in some implementations, monitoring platform 220 cannot be cloud-based (i.e., can be implemented outside of a cloud computing environment) or can be partially cloud-based.

Cloud computing environment 222 includes an environment that hosts monitoring platform 220. Cloud computing environment 222 can provide computation, software, data access, storage, etc. services that do not require end-user knowledge of a physical location and configuration of system(s) and/or device(s) that hosts monitoring platform 220. As shown, cloud computing environment 222 can include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 can host monitoring platform 220. The cloud resources can include compute instances executing in computing resource 224, storage devices provided in computing resource 224, data transfer devices provided by computing resource 224, etc. In some implementations, computing resource 224 can communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that can be provided to or accessed by client device 240. Application 224-1 can eliminate a need to install and execute the software applications on client device 240. For example, application 224-1 can include software associated with monitoring platform 220 and/or any other software capable of being provided via cloud computing environment 222. In some implementations, one application 224-1 can send/receive information to/from one or more other applications 224-1, via virtual machine 224-2.

Virtual machine 224-2 includes a software implementation of a machine (e.g., a computer) that executes programs like a physical machine. Virtual machine 224-2 can be either a system virtual machine or a process virtual machine, depending upon use and degree of correspondence to any real machine by virtual machine 224-2. A system virtual machine can provide a complete system platform that supports execution of a complete operating system ("OS"). A process virtual machine can execute a single program, and can support a single process. In some implementations, virtual machine 224-2 can execute on behalf of a user (e.g., client device 240 or an operator of monitoring platform 220), and can manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 224-4 can provide hardware virtualization techniques that allow multiple operating systems (e.g., "guest operating systems") to execute concurrently on a host computer, such as computing resource 224. Hypervisor 224-4 can present a virtual operating platform to the guest operating systems, and can manage the execution of the guest operating systems. Multiple instances of a variety of operating systems can share virtualized hardware resources.

Storage device 230 includes one or more devices capable of receiving, generating, storing, processing, and/or providing information. In some implementations, storage device 230 receives the ECU data, the location data, the distance data, and/or the like, from monitoring platform 220, and stores the ECU data, the location data, the distance data, and/or the like. In some implementations, storage device 230 provides previously stored ECU data, location data, distance data, and/or the like, to monitoring platform 220.

Client device 240 includes one or more devices capable of receiving, generating, storing, processing, and/or providing information associated with an equivalent real-time ECU speed of vehicle 210. For example, client device 240 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 240 can receive a message associated with an equivalent real-time ECU speed of vehicle 210 from monitoring platform 220.

Network 250 includes one or more wired and/or wireless networks. For example, network 250 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
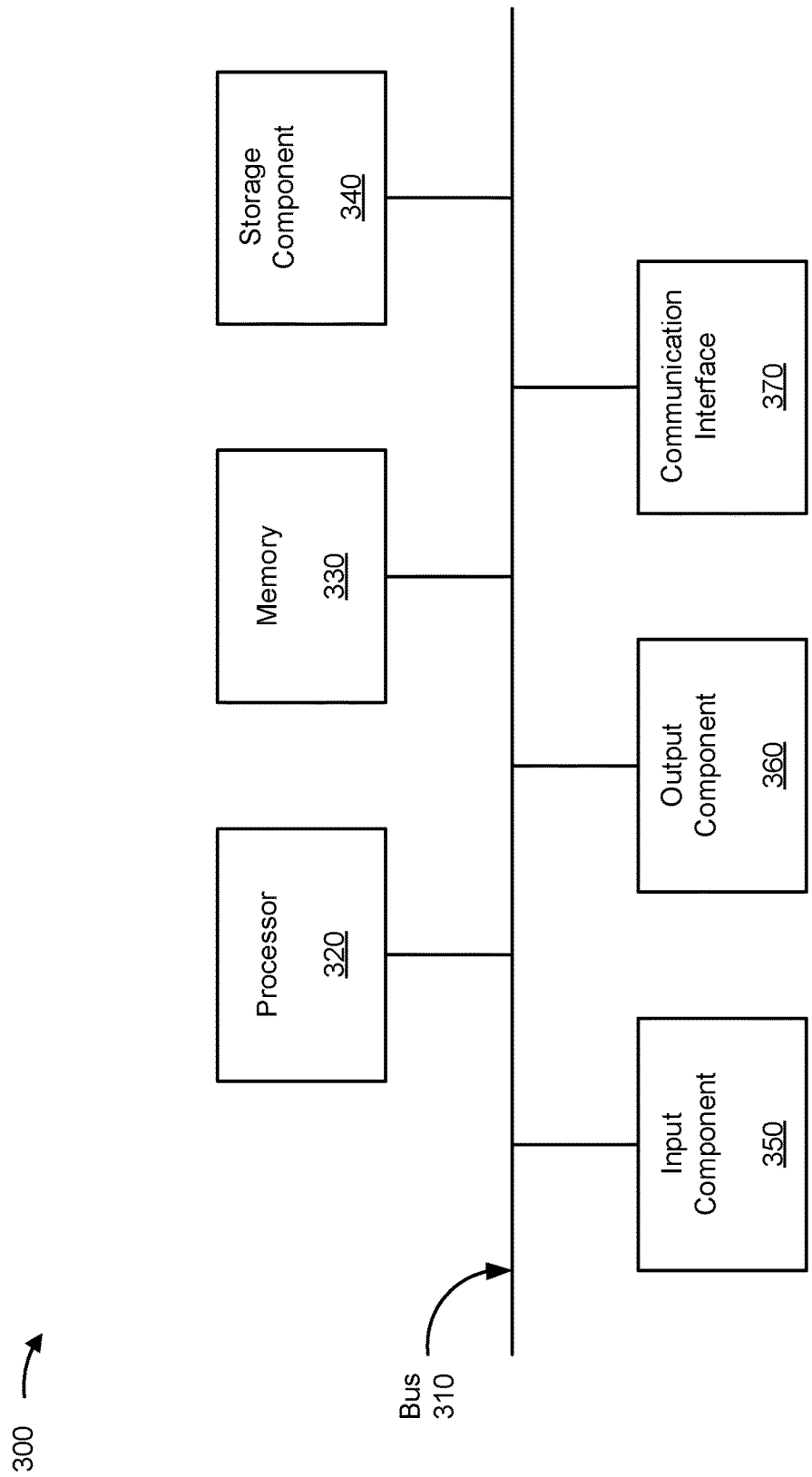
FIG. 3 is a diagram of example components of one or more devices of FIG. 2.

FIG. 3 is a diagram of example components of a device 300. Device 300 might correspond to vehicle 210, monitoring platform 220, computing resource 224, storage device 230, and/or client device 240. In some implementations, vehicle 210, monitoring platform 220, computing resource 224, storage device 230, and/or client device 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
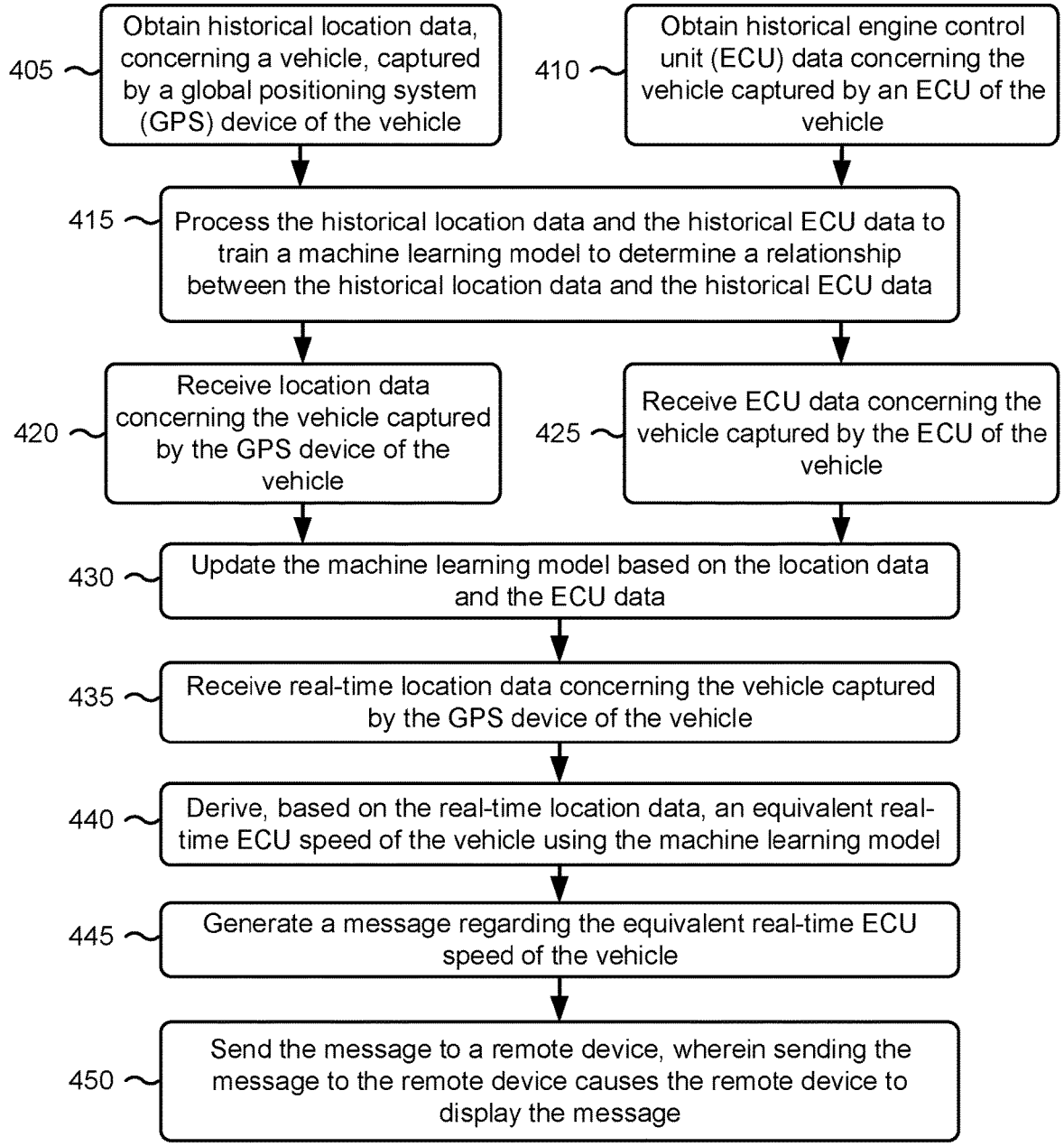
FIG. 4 is a flow chart of an example process for deriving an equivalent real-time engine control unit (ECU) speed of a vehicle.

FIG. 4 is a flow chart of an example process 400 for deriving an equivalent real-time ECU speed of a vehicle. In some implementations, one or more process blocks of FIG. 4 can be performed by a monitoring platform (e.g., monitoring platform 220). In some implementations, one or more process blocks of FIG. 4 can be performed by another device or a group of devices separate from or including the monitoring platform, such as vehicle 210, storage device 230, and/or client device 240.

As shown in FIG. 4, process 400 can include obtaining historical location data, concerning a vehicle, captured by a global positioning system (GPS) device of the vehicle (block 405). For example, the monitoring platform (e.g., using computing resource 224, processor 320, memory 330, storage component 340, input component 350, communication interface 370, and/or the like) can obtain historical location data, concerning a vehicle, captured by a GPS device of the vehicle, as described above in connection with FIGS. 1A-1D.

As further shown in FIG. 4, process 400 can include obtaining historical engine control unit (ECU) data concerning the vehicle captured by an ECU of the vehicle (block 410). For example, the monitoring platform (e.g., using computing resource 224, processor 320, memory 330, storage component 340, input component 350, communication interface 370, and/or the like) can obtain historical ECU data concerning the vehicle captured by an ECU of the vehicle, as described above in connection with FIGS. 1A-1D.

As further shown in FIG. 4, process 400 can include processing the historical location data and the historical ECU data to train a machine learning model to determine a relationship between the historical location data and the historical ECU data (block 415). For example, the monitoring platform (e.g., using computing resource 224, processor 320, memory 330, storage component 340, communication interface 370, and/or the like) can process the historical location data and the historical ECU data to train a machine learning model to determine a relationship between the historical location data and the historical ECU data, as described above in connection with FIGS. 1A-1D.

As further shown in FIG. 4, process 400 can include receiving location data concerning the vehicle captured by the GPS device of the vehicle (block 420). For example, the monitoring platform (e.g., using computing resource 224, processor 320, memory 330, storage component 340, input component 350, communication interface 370, and/or the like) can receive location data concerning the vehicle captured by the GPS device of the vehicle, as described above in connection with FIGS. 1A-1D.

As further shown in FIG. 4, process 400 can include receiving ECU data concerning the vehicle captured by the ECU of the vehicle (block 425). For example, the monitoring platform (e.g., using computing resource 224, processor 320, memory 330, storage component 340, input component 350, communication interface 370, and/or the like) can receive ECU data concerning the vehicle captured by the ECU of the vehicle, as described above in connection with FIGS. 1A-1D.

As further shown in FIG. 4, process 400 can include updating the machine learning model based on the location data and the ECU data (block 430). For example, the monitoring platform (e.g., using computing resource 224, processor 320, memory 330, storage component 340, communication interface 370, and/or the like) can update the machine learning model based on the location data and the ECU data, as described above in connection with FIGS. 1A-1D.

As further shown in FIG. 4, process 400 can include receiving real-time location data concerning the vehicle captured by the GPS device of the vehicle (block 435). For example, the monitoring platform (e.g., using computing resource 224, processor 320, memory 330, storage component 340, input component 350, communication interface 370, and/or the like) can receive real-time location data concerning the vehicle captured by the GPS device of the vehicle, as described above in connection with FIGS. 1A-1D.

As further shown in FIG. 4, process 400 can include deriving, based on the real-time location data, an equivalent real-time ECU speed of the vehicle using the machine learning model (block 440). For example, the monitoring platform (e.g., using computing resource 224, processor 320, memory 330, storage component 340, and/or the like) can derive, based on the real-time location data, an equivalent real-time ECU speed of the vehicle using the machine learning model, as described above in connection with FIGS. 1A-1D.

As further shown in FIG. 4, process 400 can include generating a message regarding the equivalent real-time ECU speed of the vehicle (block 445). For example, the monitoring platform (e.g., using computing resource 224, processor 320, memory 330, storage component 340, output component 360, communication interface 370, and/or the like) can generate a message regarding the equivalent real-time ECU speed of the vehicle, as described above in connection with FIGS. 1A-1D.

As further shown in FIG. 4, process 400 can include sending the message to a remote device, wherein sending the message to the remote device causes the remote device to display the message (block 450). For example, the monitoring platform (e.g., using computing resource 224, processor 320, memory 330, storage component 340, output component 360, communication interface 370, and/or the like) send the message to a remote device, as described above in connection with FIGS. 1A-1D. In some implementations, sending the message to the remote device can cause the remote device to display the message.

Process 400 can include additional implementations, such as any single implementation or any combination of implementations described below and/or in connection with one or more other processes described elsewhere herein.

In some implementations, the relationship can be nonlinear. In some implementations, generating the message regarding the equivalent real-time ECU speed of the vehicle can include determining that the equivalent real-time ECU speed of the vehicle satisfies a threshold, and generating the message to include information concerning the equivalent real-time ECU speed and the real-time location data. In some implementations, updating the machine learning model based on the location data and the ECU data can include determining that a portion of the location data is erroneous, discarding the portion of the location data that is erroneous and a corresponding portion of ECU data, and updating the machine learning model based on the location data and the ECU data that were not discarded.

In some implementations, the real-time location data can be received in a particular message that does not include real-time ECU data. In some implementations, the historical location data can include a plurality of location elements and a respective plurality of first timing elements and the historical ECU data can include a plurality of ECU elements and a respective plurality of second timing elements.

In some implementations, processing the historical location data and the historical ECU data to train the machine learning model to determine the relationship between the historical location data and the historical ECU data can include determining a set of first timing elements of the plurality of first timing elements and a set of second timing elements of the plurality of second timing elements, wherein the set of first timing elements corresponds to the set of second timing elements. Additionally, processing the historical location data and the historical ECU data to train the machine learning model to determine the relationship between the historical location data and the historical ECU data can include selecting a set of location elements of the plurality of location elements based on the set of first timing elements, selecting a set of ECU elements of the plurality of ECU elements based on the set of second timing elements, and processing the set of location elements, the set of first timing elements, the set of ECU elements, and the set of second timing elements to train the machine learning model.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
obtaining, by a server device, historical location data, concerning a vehicle, captured by a global positioning system (GPS) device of the vehicle;
obtaining, by the server device, historical engine control unit (ECU) data concerning the vehicle captured by an ECU of the vehicle;
processing, by the server device, the historical location data and the historical ECU data;
training, by the server device, a machine learning model using the historical location data and the historical ECU data;
determining, by the server device and using the machine learning model, a relationship between the historical location data and the historical ECU data;
receiving, by the server device, current location data concerning the vehicle captured by the GPS device of the vehicle;
receiving, by the server device, current ECU data concerning the vehicle captured by the ECU of the vehicle;
updating, by the server device, the machine learning model based on the current location data and the current ECU data;
receiving, by the server device, real-time location data concerning the vehicle captured by the GPS device of the vehicle;
deriving, by the server device and based on the real-time location data, an equivalent real-time ECU speed of the vehicle using the machine learning model;
generating a message regarding the equivalent real-time ECU speed of the vehicle; and
sending the message to a remote device,
wherein sending the message to the remote device causes the remote device to display the message.

2. The method of claim 1, wherein the relationship is nonlinear.

3. The method of claim 1, wherein generating the message regarding the equivalent real-time ECU speed of the vehicle comprises:
   determining that the equivalent real-time ECU speed of the vehicle satisfies a threshold; and
   wherein the message includes information concerning the equivalent real-time ECU speed and the real-time location data.

4. The method of claim 1, wherein updating the machine learning model based on the current location data and the current ECU data comprises:
   determining that a portion of the current location data is erroneous,
   discarding the portion of the current location data that is erroneous and a corresponding portion of the current ECU data, and
   updating the machine learning model based on the current location data and the current ECU data that were not discarded.

5. The method of claim 1, wherein the received real-time location data does not include real-time ECU data.

6. The method of claim 1, wherein the historical location data includes a plurality of location elements and a respective plurality of first timing elements and the historical ECU data includes a plurality of ECU elements and a respective plurality of second timing elements.

7. The method of claim 6, wherein processing the historical location data and the historical ECU data comprises:
   determining a set of first timing elements of the plurality of first timing elements and a set of second timing elements of the plurality of second timing elements, wherein the set of first timing elements corresponds to the set of second timing elements,
   selecting a set of location elements of the plurality of location elements based on the set of first timing elements,
   selecting a set of ECU elements of the plurality of ECU elements based on the set of second timing elements, and
   processing the set of location elements, the set of first timing elements, the set of ECU elements, and the set of second timing elements to train the machine learning model.

8. A server device, comprising:
   one or more memories; and
   one or more processors, communicatively coupled to the one or more memories; configured to:
      obtain historical location data, concerning a vehicle, captured by a global positioning system (GPS) device of the vehicle;
      obtain historical engine control unit (ECU) data concerning the vehicle captured by an ECU of the vehicle;
      process the historical location data and the historical ECU data;
      train a machine learning model using the historical location data and the historical ECU data;
      determine, using the machine learning model, a relationship between the historical location data and the historical ECU data;
      receive current location data concerning the vehicle captured by the GPS device of the vehicle;
      receive current ECU data concerning the vehicle captured by the ECU of the vehicle;
      update the machine learning model based on the current location data and the current ECU data;
      receive real-time location data concerning the vehicle captured by the GPS device of the vehicle;
      derive, based on the real-time location data, an equivalent real-time ECU speed of the vehicle using the machine learning model;
      generate a message regarding the equivalent real-time ECU speed of the vehicle; and
      send the message to a remote device,
         wherein sending the message to the remote device causes the remote device to display the message.

9. The server device of claim 8, wherein the relationship is nonlinear.

10. The server device of claim 8, wherein the one or more processors, when generating the message regarding the equivalent real-time ECU speed of the vehicle, are configured to:
   determine that the equivalent real-time ECU speed of the vehicle satisfies a threshold, and
   wherein the message includes information concerning the equivalent real-time ECU speed and the real-time location data.

11. The server device of claim 8, wherein the one or more processors, when updating the machine learning model based on the current location data and the current ECU data, are configured to:
   determine that a portion of the current location data is erroneous,
   discard the portion of the current location data that is erroneous and a corresponding portion of the current ECU data, and
   update the machine learning model based on the current location data and the current ECU data that were not discarded.

12. The server device of claim 8, wherein the received real-time location data does not include real-time ECU data.

13. The server device of claim 8, wherein the historical location data includes a plurality of location elements and a respective plurality of first timing elements and the historical ECU data includes a plurality of ECU elements and a respective plurality of second timing elements.

14. The server device of claim 13, wherein the one or more processors, when processing the historical location data and the historical ECU data, are configured to:
   determine a set of first timing elements of the plurality of first timing elements and a set of second timing elements of the plurality of second timing elements, wherein the set of first timing elements corresponds to the set of second timing elements,
   select a set of location elements of the plurality of location elements based on the set of first timing elements,
   select a set of ECU elements of the plurality of ECU elements based on the set of second timing elements, and
   process the set of location elements, the set of first timing elements, the set of ECU elements, and the set of second timing elements to train the machine learning model.

15. A non-transitory computer-readable medium storing instructions, the instructions comprising:
   one or more instructions that when executed by one or more processors of a server device, cause the one or more processors to:
      obtain historical location data, concerning a vehicle, captured by a global positioning system (GPS) device of the vehicle;

obtain historical engine control unit (ECU) data concerning the vehicle captured by an engine control unit (ECU) of the vehicle;
process the historical location data and the historical ECU data;
train a machine learning model using the historical location data and the historical ECU data;
determine, using the machine learning model, a relationship between the historical location data and the historical ECU data;
receive current location data concerning the vehicle captured by the GPS device of the vehicle;
receive current ECU data concerning the vehicle captured by the ECU of the vehicle;
update the machine learning model based on the current location data and the current ECU data;
receive real-time location data concerning the vehicle captured by the GPS device of the vehicle;
derive, based on the real-time location data, an equivalent real-time ECU speed of the vehicle using the machine learning model;
generate a message regarding the equivalent real-time ECU speed of the vehicle; and
send the message to a remote device,
wherein sending the message to the remote device causes the remote device to display the message.

16. The non-transitory computer-readable medium of claim 15, wherein the one or more instructions, that cause the one or more processors to generate the message regarding the equivalent real-time ECU speed of the vehicle, cause the one or more processors to:
determine that the equivalent real-time ECU speed of the vehicle satisfies a threshold, and
wherein the message includes information concerning the equivalent real-time ECU speed and the real-time location data.

17. The non-transitory computer-readable medium of claim 15, wherein the one or more instructions, that cause the one or more processors to update the machine learning model based on the current location data and the current ECU data, that cause the one or more processors to:
determine that a portion of the current location data is erroneous,
discard the portion of the current location data that is erroneous and a corresponding portion of the current ECU data, and
update the machine learning model based on the current location data and the current ECU data that were not discarded.

18. The non-transitory computer-readable medium of claim 15, wherein the received real-time location data does not include real-time ECU data.

19. The non-transitory computer-readable medium of claim 15, wherein the historical location data includes a plurality of location elements and a respective plurality of first timing elements and the historical ECU data includes a plurality of ECU elements and a respective plurality of second timing elements.

20. The non-transitory computer-readable medium of claim 19, wherein the one or more instructions, that cause the one or more processors to process the historical location data and the historical ECU data, cause the one or more processors to:
determine a set of first timing elements of the plurality of first timing elements and a set of second timing elements of the plurality of second timing elements,
wherein the set of first timing elements corresponds to the set of second timing elements,
select a set of location elements of the plurality of location elements based on the set of first timing elements,
select a set of ECU elements of the plurality of ECU elements based on the set of second timing elements, and
process the set of location elements, the set of first timing elements, the set of ECU elements, and the set of second timing elements to train the machine learning model.

* * * * *